United States Patent

[11] 3,536,044

| [72] | Inventors | Louis Stephens<br>21260 N.E. 23rd Ave, North Miami Beach, 33160 and<br>Joe H. Branam, 6095 W. 8th Ave., Hialeah, Florida 33012 |
|---|---|---|
| [21] | Appl. No. | 750,106 |
| [22] | Filed | Aug. 5, 1968 |
| [45] | Patented | Oct. 27, 1970 |

[54] ANIMAL CAGE
22 Claims, 9 Drawing Figs.

[52] U.S. Cl. .................................................. 119/17, 119/22
[51] Int. Cl. ........................................................ A01k 01/02
[50] Field of Search ............................................ 119/17, 18, 19, 22; 220/19

[56] References Cited
UNITED STATES PATENTS

| 3,087,458 | 4/1963 | Bennett .......................... | 119/17 |
| 3,087,459 | 4/1963 | Dirck ............................. | 119/17 |

*Primary Examiner*—Hugh R. Chamblee
*Attorney*—John Cyril Malloy

ABSTRACT: An improved cage for small animals providing (A) an enclosure primarily of sheet form material including a floor pan, side and rear walls and a roof member with a U-shaped rigidifying portion to interconnect the floor pan and side walls and (B) a hingedly mounted swingable open work door for the enclosure to span an opening of the enclosure, and (C) latch means to secure the door in spanning relation of the opening of the enclosure. The swingable door is adapted to be either a right-hand throw or a left-hand throw and the latch means and hinge connections of the door are adapted to be interchanged, the latch means comprising a cam-type latch bar adapted to be moved vertically in response to slamming action of the door by pins to engage the cam surface of the latch bar and to be trapped in catch slots of the latch bar.

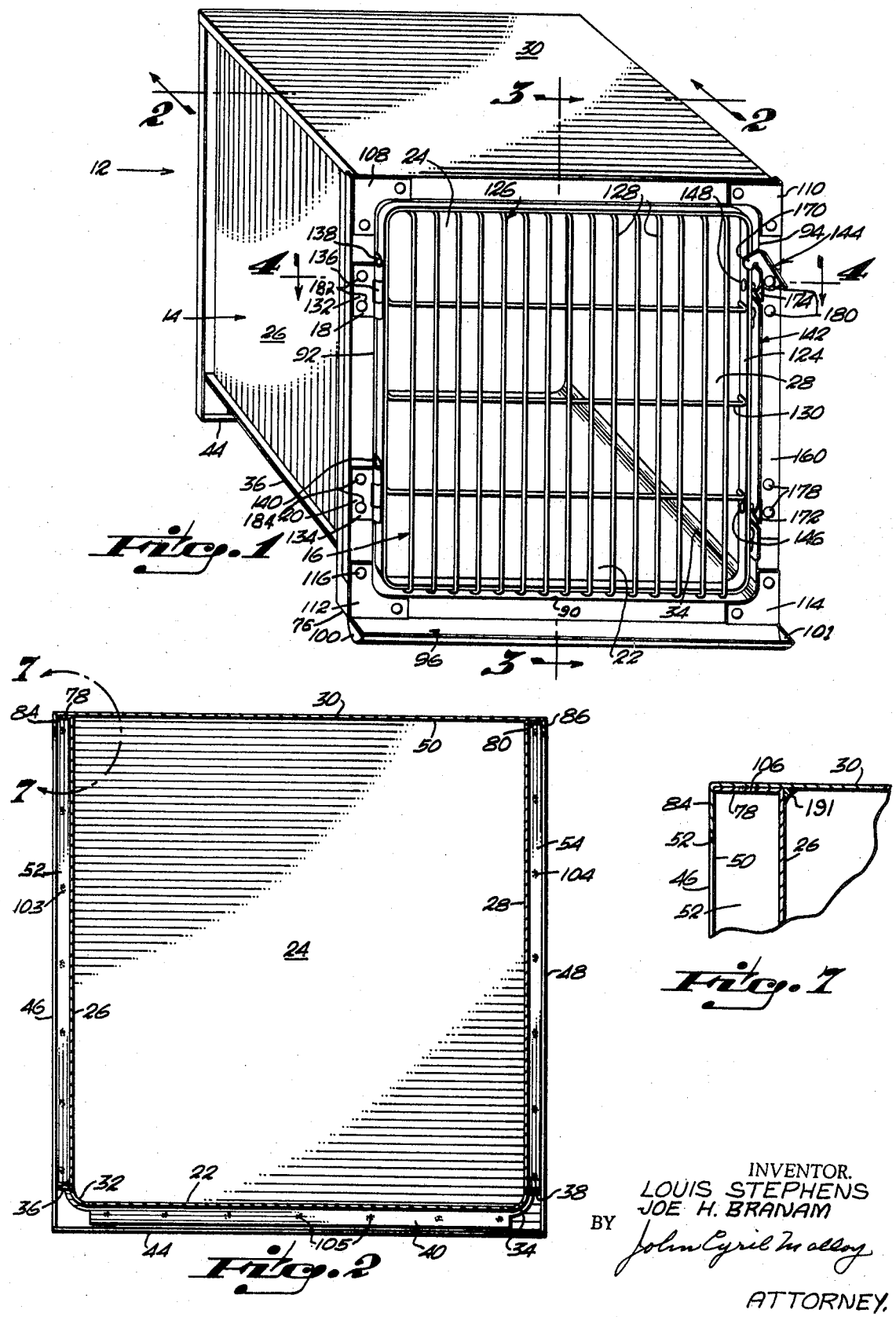

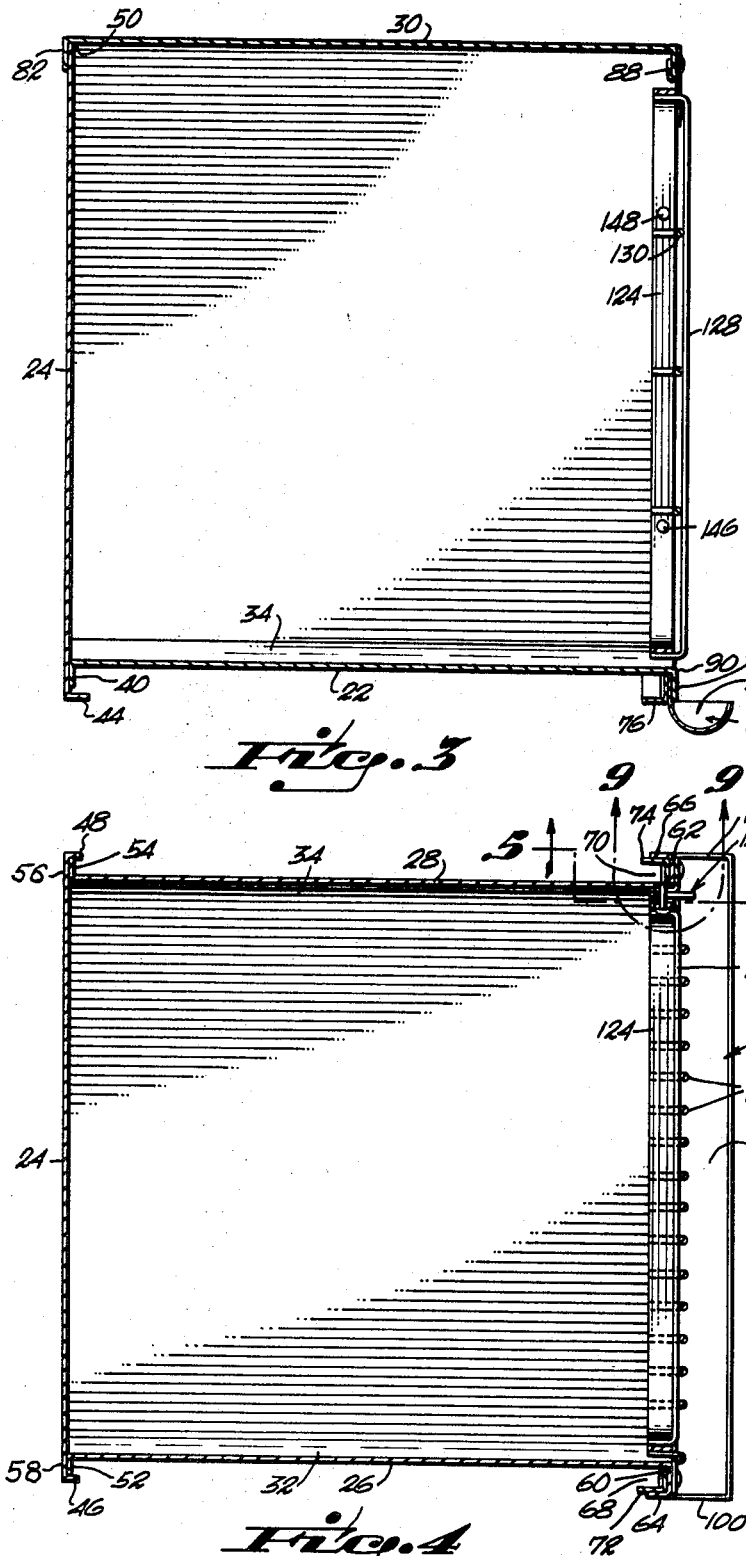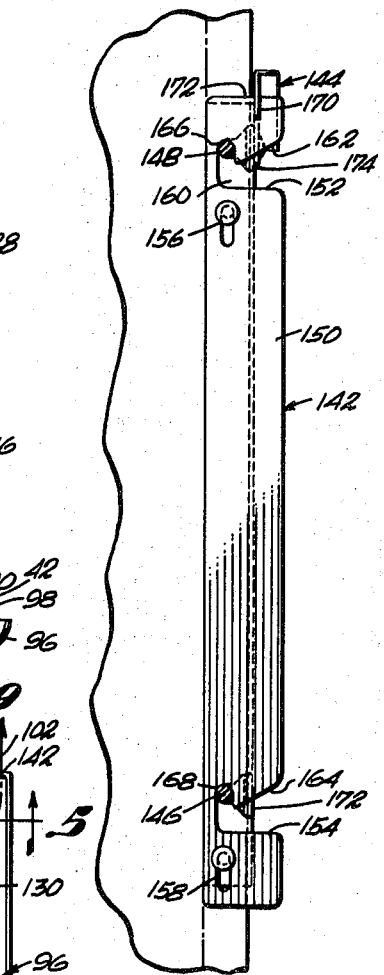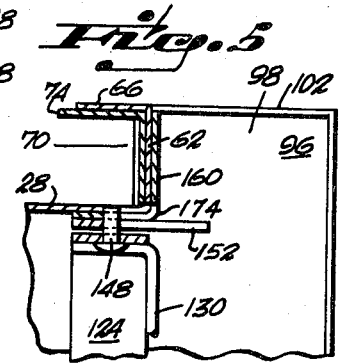

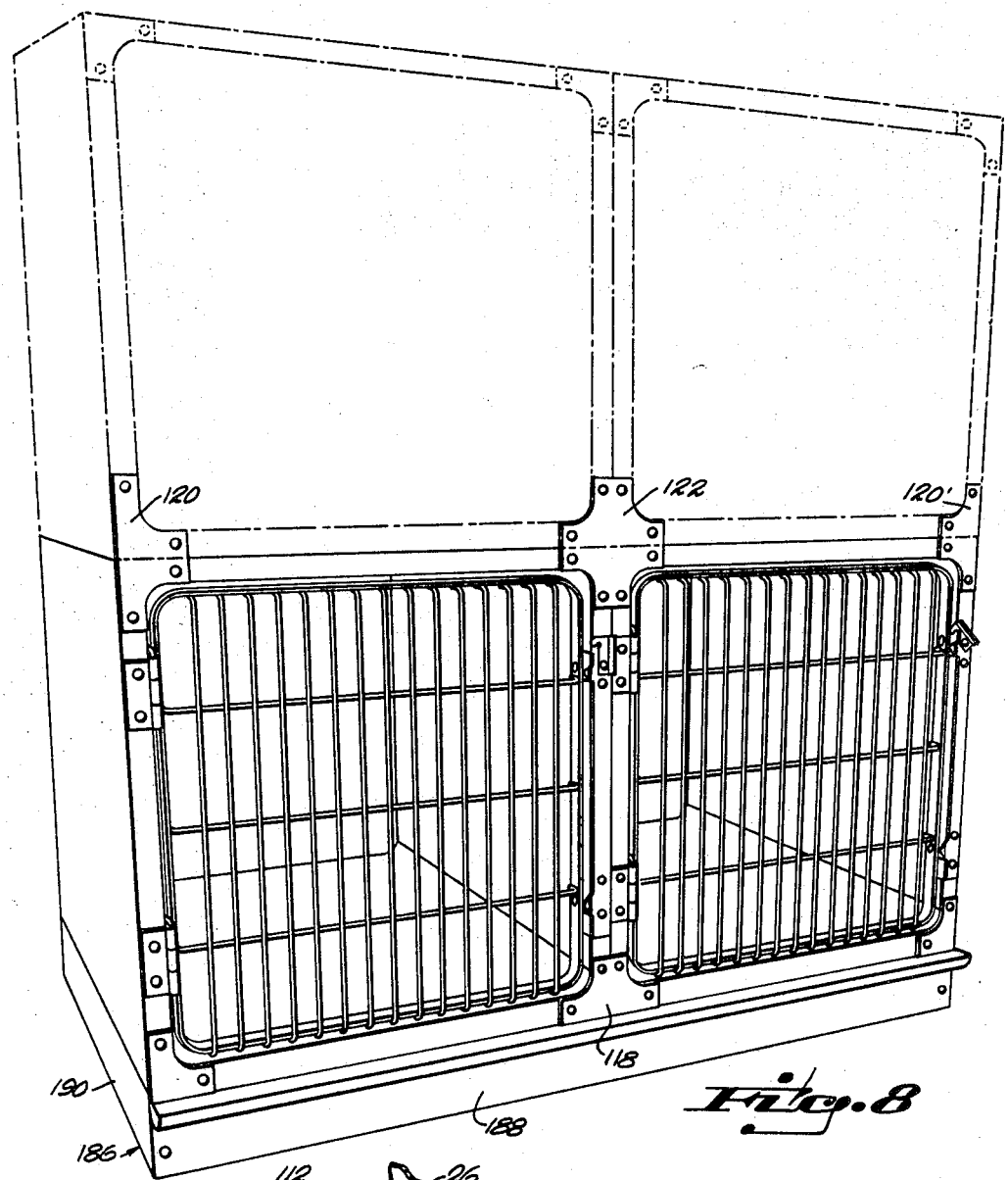
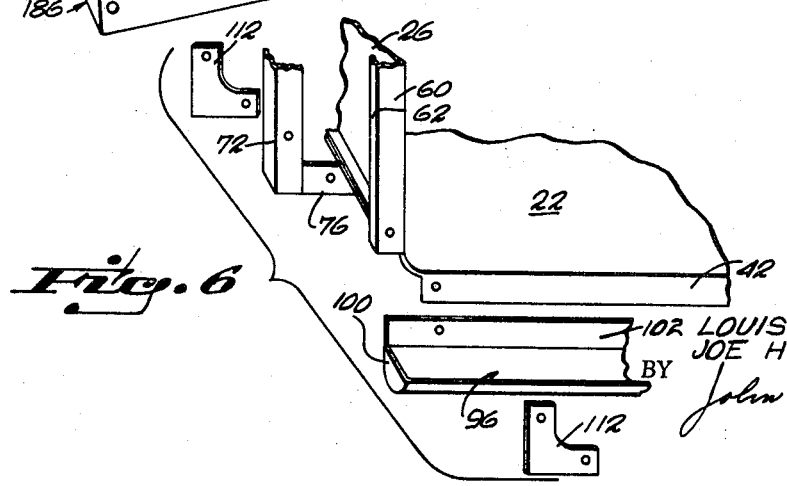

ANIMAL CAGE

In the past, a need has arisen for a cage for small animals which is adapted to be readily cleaned and which may be stacked in rows and tiers for use in research labs, kennels and for distribution and sale of pets in pet shops and the like, which are of noncorrosive material and which are adapted for installation in a variety of locations by reason of doors which are of either a left-hand throw or a right-hand throw type. The present invetnion provides a six-sided animal cage which includes an enclosure having a opening and which is constructed primarily of sheet material with a minimum of rigidifying members and a swingable open work door for the enclosure with latch means being provided for the door to connect the door and the enclosure.

It is, accordingly, an object of this invention to provide an improved cage which includes an enclosure primarily of sheet form material with a minimum number of rigidifying members.

It is also an object of this invention to provide an improved cage which includes an enclosure which is adapted to be readily cleaned and which is primarily constructed of sheet material, the floor pan of the enclosure being adapted for drainage and preferably including a gutter arrangement to be secured along the front face of the floor pan.

It is another object of this invention to provide an improved enclosure of inexpensive, lightweight construction, primarily of sheet material which includes a minimum amount of rigidifying members and which is adapted to be stacked in columns and tiers.

It is also an object of this invention to provide an improved cage including an enclosure with an opening and a swingable door for movement into and out of the plane of said opening which includes an improved latch means by reason of which the door may be either a left-hand throw or a right-hand throw depending upon the site at which the same is employed.

It is another and general object of this invention to provide an improved cage construction for an enclosure primarily of sheet form, noncorrosive material and for a novel latch means and hinge connection for selectively securing a swingable door to the enclosure for a right-hand or, alternatively, a left-hand throw.

It is a general object of this invention to provide an improved, inexpensive cage which is simple in consturction, adapted to be readily cleaned, to be stacked or arranged in side-by-side relation with similarly constructed cages, and well adapted for use in kennels, research labs, pet stores and veterinary offices for small animals. In accordance with these and other objects which will become apparent hereinafter, the instant invention will now be desribed with reference to the accompanying drawings in which:

FIG. 1 is a perspective view of a cage constructed in accordance with this invention;

FIG. 2 is a vertical view in cross section taken along the plane indicated by the line 2–2 of FIG. 1 and looking in the direction of the arrows;

FIG. 3 is a vertical view in cross section taken along the plane indicated by the line 3–3 OF FIG. 1 and looking in the direction of the arrows;

FIG. 4 is a plan view in cross section taken along the plane indicated by line 4–4 of FIG. 1 and looking in the direction of the arrows;

FIG. 5 is a partial enlarged view taken along the plane indicated by the line 5–5 of FIG. 4 and looking in the direction of the arrows;

FIG. 6 is an exploded perspective view of the lower left-hand corner of FIG. 1 to illustrate the relative arrangement of the interconnected flanges of the cage and the means for securing the same together;

FIG. 7 is an enlarged partial view of that portion of FIG. 4 with the arrowed line 7–7 therearound;

FIG. 8 is a perspective view of a plurality of the cages arranged in a tier on a rack and illustrating in chain dot lines a plurality of the cages interconnected in a bank of rows and tiers; and FIG. 9 is a an enlarged view of the upper right-hand portion of FIG. 4.

Referring particularly to the drawings, wherein like reference characters designate like or corresponding parts throughout the different views, and referrring particularly to FIG. 1, the numeral 12 generally designates a cage which it is seen includes a boxlike enclosure 14 provided with a swingable cpen work door 16 hingedly mounted as at 18 and 20 to the enclosure. The enclosure is composed of a floor pan 22, an upstanding rear wall 24 and opposing side walls 26 and 28, the walls being bridged by a roof member 30. As can be seen in FIG. 1, for instance, the front to rear margins 32 and 34 of the floor pan are arcuate in form curving upwardly and outwardly with each of the margins being provided with an outwardly directed flange 36 and 38 with the plane of the flanges being inclined slightly with respect to the horizontal so that the outermost edge is slightly elevated with respect to the inner edge and with the flanges providing a generally horizontal but a lightly inwardly sloped pair of support surfaces for the side walls, as will be explained. With coninuing reference to the floor pan 22, the rearward edge, as can be seen in FIGS. 2 and 3, is provided with a downwardly turned flange 40; and, as can be seen in FIG. 6, for instance, the frontmost edge of the floor pan is also provided with a downwardly turned flange 42. Referring to the walls, and firstly to the rear wall 24, it is seen, FIG. 2, that it is provided with a lowermost support foot 44 and that the vertical edges are inturned defining the flanges 46 and 48 extending from the foot to an upper terminal edge 50 which extends laterally across the cage, and the upper end of each of the flanges is notched as at 52 in FIG. 7 for a purpose which will become apparent upon description of the roof member 30; now, with regard to the side walls 26 and 28, each is provided with a vertically extending, outturned flange 52 and 54, FIG. 4, to abut the vertically extending margins 56 and 58 of the back member 24 with the terminal edge of the outturned flanges 52 and 54 abutting the flanges 46 and 48 of the rear wall 24. Additionally, each of the side walls is provided with a vertically extending flange 60 and 62, each of which is provided with a rear bent lip 64 and 66 which defines a vertically extending hollow 68 and 70 for receiving a vertically extending rigidifying member 72 or 74 of angle bar configuration nestingly within each hollow, in a manner which is clearly seen in FIG. 6. The rigidifying members 72 and 74 are spanned by a horizontal rigidifying member 76 in spanning relation of the cage immediately behind the downturned floor pan flange 42. The upper terminal edge of each of the side walls is provided with an outturned, horizontally extending support flange 78 and 80 defining a support plane at a height commensurate with the top edge 50 of the back wall which support the roof 30. As can be seen in FIG. 3, the rear edge of the roof 30 is provided with a downturned flange 82 which overlays the margin of the rear wall 24 along the upper edge 50, and, as can be seen in FIGS. 2 and 7, the roof member 30 is provided with downturned side flanges 84 and 86 defining a channel within which the outturned horizontally extending flanges 78 and 80 of the side walls are received. With continuing reference to the roof member 30, and as can be seen in FIG. 3, the forward edge is provided with a flange 88 of double thickness which provides a finished edge for the top of a door opening, which is also bounded by the front edge 90 of the floor pan and the vertically extending edges 92 and 94 of the side walls. In the preferred embodiment, the floor pan is slightly inclined or sloped downwardly from the rear to the front to promote drainage from rear to the front. It is also seen that the arcuate margins 32 and 34 of the floor pan as well as the slightly sloped flanges 36 and 38 of the margins similarly promote such drainage. For collecting drained materials, a gutter member 96 seen, for instance in FIG. 6, may be provided which defines a trough 98 closed at the ends 100 and 101 having a vertically extending lip 102 which is adapted to be received in clamped relation between the horizontally extending rigidifying member 76 and the downturned front flange 42 of the floor pan and secured by means of rivets or welding. The various overlaying flanges are secured to their respective adjacent mating surfaces by spot welding seams as indicated, for instance, in FIG. 2 by the numerals 103, 104, and 105, and, in the case of the connection of the side walls to the roof 30, as seen in FIG. 7, by welding as indicated at 106. It will be seen that the enclosure which has been described is adapted to be made primarily of stainless steel or other noncorrosive sheet material and is of relatively inexpensive construction, while at the same time being rendered strong and sturdy with a minimum of relatively expensive rigidifying members such as angle irons 72 and 74 spanned by the horizontal rigidifying member 76 defining a frame which nests within the hollows of the side walls and underlies the front flange 42 of the floor pan 24 by reason of which an inexpensive cage enclosure 14 has been provided.

Referring to FIGS. 1 and 6, it is seen that in the case of a single cage 12, corner plates 108, 110, 112 and 114 are provided to reinforcingly secure the corners of the front to the corners of the enclosure about the opening, the corner plates each providing a leg to overlay the adjacent surfaces. Each bottom corner plate comprises a pair for a clamping-type engagement as indicated in FIG. 6 for drawing the intermediate portions of the enclosure members members together to receive suitable fasteners therebetween such as rivets and preferably nuts and headed bolts 116, FIG. 1, lower left. It will be seen in FIG. 8 that when it is desired to join together a pair of the enclosures in side-by-side relation; a front T-shaped corner bracket 118 may be employed to interconnect the adjacent corners and to overlap the abutting side walls serving the purpose of joining the members together. Similarly configured T-shaped corner brackets 120 and 120' may be provided to accommodate stacking of a pair of the enclosures. In the event that it is desired to stack a plurality of such enclosures, a cross-shaped corner bracket means 122 may be provided to overlay the adjacent surfaces of the enclosures at the front abutting corners of the enclosures. Referring to the door 16, it is seen that it is composed of a peripheral member 124 sized companionately so as to be receivable in a plane of closure of the opening bounded by the confronting edges 92 and 94 of the side walls and flange 88 of the roof and edge 90 of the floor pan. The member 124 is spanned by an open work 126 of vertical bars 128 and lateral struts 130 suitably interconnected and secured by welding of the inturned portions to the member 124. The hinges 18 and 20 each comprise a plate such as that designated by the numerals 132 and 134, each having a pair of aligned spaced ears with a coaxial recess for receiving a lug 136 secured on the peripheral member 124 of the door to accommodate a hinge pin 138 and 140. Latch means generally designated by the numeral 142 are provided to secure the door in closing relation of the enclosure opening and a keeper 144 is provided for the latch means, as will now be explained on reference to FIGS. 1, 5, 4 and 9. To the swinging edge of the door a pair of pins 146 and 148 are mounted which extend outwardly of the door in the plane of the door. A vertically movable latch bar 150 is secured on the opening to the side wall of the enclosure, which latch bar includes a pair of catch slots 152 and 154, one to receive each of the pins 146 and 148. It will be seen that the latch bar 150 is vertically movable by reason of a pin and slot connection 156 and 158 of the latch bar to a carrier 160 which is adapted to be secured to the side wall as a unit. Within the path of travel of the pins, a pair of cam surfaces 162 and 164 are provided on the latch bar to cause the latch bar to yield in response to slamming of the door by camming the latch bar 150 upwardly for subsequent entrapment of the pins 146 and 148 in the bights 166 and 168 of the catch slots. The carrier 160 also includes the swingable keeper 144 with a hook end 170 for hooked-up engagement with the upper edge 172 of the latch bar to secure the same in a locked position when an animal is in the cage. As can be seen in FIGS. 1 and 9, the latch bar carrier may be provided with a cutaway portion 172 and 174 to provide easy, nonbinding entry of the pins 146 and 148 into the catch slots. As can also be seen in FIG. 1, the doors of the cage are adpated to either be for a right-handed throw or a left-handed throw by reason of the fact that the carrier 160 with the attached latch bar 150 may be alternatively mounted as by the pairs of screws 178 and 180 either to the front face of the right-handed side wall or the front face of the left-hand side wall. To accommodate this interchangeability, the upper and lower companion pairs of holes for the carrier pair of screws 178 and 180 are at the same height from the floor pan as are the holes for the pairs of screws 182 and 184 of the hinge plates and commensurate with the height of the hinge lugs 134 and 136 of the hinges 18 and 20. As can be seen in FIG. 8, a support rack 186 or foundation for the cage is provided. The support rack 186 is composed of a front face plate 188 and opposing side plates, such as 190, and upon it a stack of interconnected cages may rest or a plurality of cages in side-by-side relation with the foot 44 of the rear wall and the lowermost edge 76 of the rigidifying members providing the load bearing surfaces.

It is thus seen that there has been provided a stackable, highly flexible, inexpensive sheet form cage which is adapted for either left-hand swinging doors or right-hand swinging doors and which includes latch means and keeper means and easy maintainance-type cages for small animals. As indicated in FIG. 7, the lines of juncture of the floor pan and walls and, preferably, of the roof member and walls are each smoothly sealed by a filler 191 preferably of resin material to avoid dirt accumulations.

While the instant invention has been shown and described herein in what is conceived to be the most practical and preferred embodiment, it is recognized that departures may be made therefrom within the scope of the invention, which is, therefore, not to be limited to the details disclosed herein, but is to be accorded the full scope of the claims so as to embrace any and all equivalant apparatus and articles.

We claim:

1. An animal cage comprising, in combination, (1) an enclosure having an opening, (2) a door, (3) hinge means to connect the door for swinging movement into and out of a plane of closure of said opening, and (4) latch means to secure the door in said plane of closure, said enclosure comprising:
   A. a floor pan having a downwardly turned front flange and outwardly directed side flanges defining a pair of support surfaces;
   B. an upstanding back wall secured to said floor pan;
   C. a pair of opposed, upstanding side walls, each of said side walls having an outwardly directed flange and one of said side walls resting on each of said support surfaces, and means to secure the side walls to the floor pan along said support surfaces;
   D. a roof member including means to connect said roof member over said side walls and said rear wall;
   E. each of said side walls including an outwardly extending flange defining in combination with said downwardly turned front flange a front face of said enclosure circumposed about the bottom and sides of said opening; and
   F. rigidifying means underlying said front face defining flanges of said side walls and said floor pan, said floor pan, walls and roof member being of sheet material and said ridigifying means comprising interconnected bar members and means to connect the bar member to said face defining flanges of said side walls and said floor pan to reinforce said cage about said opening and to distribute forces on slamming of said door.

2. The animal cage as set forth in claim 1 wherein said floor pan includes a downwardly turned rear flange overlaying and engaging said back wall beneath said floor pan.

3. The animal cage as set forth in claim 1 wherein said floor pan is provided with upwardly and outwardly curved marginal edges intermediate the central portion of said floor pan and said outwardly directed side flanges defining said support surfaces facilitate cleaning of the interior of said cage.

4. The animal cage as set forth in claim 1 wherein said roof member includes a vertical front face portion above the front flange of said floor pan and comprising a portion of the front face of said enclosure.

5. The animal cage as set forth in claim 4 wherein said front face portion of said roof member comprises a vertically extending flange on said roof member reversely bent to provide a flange of double thickness.

6. The animal cage as set forth in claim 2 wherein said back wall includes a portion extending beneath said floor pan and foot means on the lower terminal edge of said back edge to support said enclosure, the portion of said rigidifying means underlying said front face defining flange of said floor pan also including a support surface in the same plane as that of the foot means of said back wall.

7. The animal cage as set forth in claim 6 wherein said foot means comprises a horizontally extending flange on said back wall.

8. The animal cage as set forth in claim 1 wherein said outwardly extending flanges of said side walls defining said front face include a lip portion extending toward the plane of said back wall and defining a vertical hollow extending between said roof member and said floor pan and said rigidifying means comprising a vertical bar nested within said hollow and means securing said rigidifying means within said hollow.

9. The animal cage as set forth in claim 8 wherein corner plates are provided to overlay the flanges at the lower corners of the front face enclosure and fastening means to hold said corner plates and flanges in tight relation and to bind the flanges to said rigidifying means.

10. At least two animal cages as set forth in claim 1, said cages being commonly oriented with respect to a support surface and corner plates are provided to overlay the flanges at the lower corners of the front faces of said enclosures and fastening means are provided extending through said corner plates and flanges to hold said corner plates and flanges in tight relation and to bind said flanges to said rigidifying means, said corner plates at the adjacent corners of the front face of the enclosures of the cages including a common corner plate of inverted generally T-form to span the adjacent front faces and hold the cages together.

11. The animal cage as set forth in claim 1 wherein gutter means are provided along the downwardly turned front flange of said floor pan.

12. The animal cage as set forth in claim 11 wherein said gutter comprises a flange underlying said downwardly turned front flange of said floor pan.

13. The animal cage as set forth in claim 1 wherein the rear portion of the floor pan is slightly elevated with respect to the front of the floor pan to promote rear to front drainage.

14. The animal cage as set forth in claim 1 wherein the support surfaces are sloped downwardly toward one another to promote drainage from said side flanges into said floor pan, and the central portion of said pan is lower than the support surfaces to promote drainage.

15. The animal cage as set forth in claim 1 wherein liner means of resin material are provided to smoothly seal the abutting lines of juncture of said floor pan and said walls to seal the inside of said enclosure.

16. The animal cage as set forth in claim 1 wherein said latch means comprises:

a pair of fixed striker pins extending distally of the swinging edge of the door and parallel to the plane of closure when said door is closed;

a gravity operated latch bar having vertical guide slots and including means to mount the latch bar to the enclosure along said opening at the plane of closure and in the path of movement of said striker pins, said means to mount comprising guide pins positioned in said vertical guide slots and effective to permit vertical movement of the latch bar relative to said enclosure between (a) a normal latch position with said guide pins at the upper end of said guide slots and (b) an unlatched position with the guide pins in the lower end of the guide slots;

said latch bar having a pair of catch slots, each of said catch slots having a mouth opening away from the plane of closure and toward the path of swinging movement of one of the striker pins when said latch bar is in the said unlatched position;

each said catch slot having an enlarged vertically extending trap portion above said mouth defining a shoulder intermediate the trap portion and the face of the latch bar presented to the striker pins on swinging movement of the door when said latch bar is in the normal position; and each of said shoulders comprising a cam surface leading inwardly to said mouth opening so that when the door is slammed and the latch bar is in the normal position, the striker pins on the door will impact upon the cam surfaces to lift said latch bar relative to said enclosure to said unlatched position and each of the striker pins will move into one of the catch slots whereupon gravity will return the latch bar to the normal position.

17. The animal cage as set forth in claim 16 wherein keeper means are provided to hold the latch bar against vertical movement.

18. The animal cage as set forth in claim 16 wherein said latch bar includes a carrier and means to connect the carrier along the edge of the closure on the face adjacent the swinging edge of the door at the plane of closure whereby the carrier may be mounted to the enclosure for a left-hand swinging door or a right-hand swinging door.

19. In a cage for small animals including:
A. a boxlike enclosure with an opening;
B. a door of open work construction;
C. hinge means to swingably connect the door to the enclosure for opening and closing movement with respect to a plane of closure of said opening; and
D. latch means for releasably securing the door to the enclosure in closing relation of the opening, the improvement wherein said latch means comprises:
1. a pair of spaced striker pins extending distally of the swinging edge of the door;
2. a latch bar on said enclosure along said opening and having a pair of catch slots;
3. pin and vertical slot means to mount the latch bar to the enclosure to adapt the latch bar for vertical movement between (a) a normal latched position of hooked-up engagement of the pins in the catch slots and (b) a pin release position; and
4. each of said catch slots having a mouth opening at the plane of closure toward the path of swinging movement of the striker pins when said latch bar is in the pin release position, said mouth leading to an enlarged, vertically extending trap portion and said latch bar including a cam surface outwardly inclined from said mouth with the cam surface being at the plane of closure and facing toward the path of swinging movement of the striker pins when said latch is in the normal position and responsive to impact by the striker pins to lift the latch bar to the pin release position to permit movement of the striker pins into the mouth and subsequent vertical movement of the latch bar to trap the striker pins in the trap portion when the pins clear the cam surface, whereby on slamming of the door the striker pins are adapted to be trapped in the catch slots to lock the door in a closed position.

20. The animal cage as set forth in claim 19 wherein keeper means are provided to hold the latch bar against vertical movement when in said normal position.

21. The animal cage as set forth in claim 20 wherein the keeper means comprise a pivotally mounted hook member supported on said enclosure and adapted to be moved into and out of hooked up engagement with the latch bar.

22. The animal cage as set forth in claim 19 wherein said latch bar includes a carrier member and means to connect the carrier along the edge of the enclosure on the face adjacent the swinging edge of the door at the plane of closure, and means to mount said carrier, whereby the carrier may be mounted to the enclosure for either a left-hand swinging door or a right-hand swinging door.